United States Patent [19]

Bradford et al.

[11] 4,056,118

[45] Nov. 1, 1977

[54] SYPHON TUBE AND VENT VALVE ASSEMBLY

[75] Inventors: Jay H. Bradford, Elgin; Norman T. Terp, St. Charles, both of Ill.

[73] Assignee: Eaton Corporation, Cleveland, Ohio

[21] Appl. No.: 613,385

[22] Filed: Sept. 17, 1975

[51] Int. Cl.² .............................................. F16T 1/20
[52] U.S. Cl. .................................. 137/201; 137/202
[58] Field of Search ................. 236/61, 62, 63, 64, 236/65, 66, 67; 137/201, 202; 285/DIG. 22

[56] References Cited

U.S. PATENT DOCUMENTS

| | | | |
|---|---|---|---|
| 888,913 | 5/1908 | Leuthesser | 137/201 |
| 1,075,294 | 10/1913 | Leuthesser | 137/201 |
| 2,750,232 | 6/1956 | Szantag | 138/172 X |

*Primary Examiner*—Alan Cohan
*Attorney, Agent, or Firm*—Teagno & Toddy

[57] ABSTRACT

An improved radiator vent valve and syphon tube assembly is provided, the vent valve including a valve body and a threaded valve nipple adapted to engage a wall of a radiator. The nipple defines a passage communicating between the interior of the radiator and the interior of the valve body and the syphon tube drains condensate from the interior of the valve body into the radiator. The syphon tube includes a tubular portion adapted to be inserted into the passage defined by the nipple, the tubular portion including resilient tabs about its outer surface which permit insertion of the tubular portion into the nipple and after insertion, yieldably engage an inner surface of the nipple. The syphon tube also includes a generally trough-shaped portion coplanar with the tubular portion and another trough-shaped portion oriented to direct the flow of condensate downward when the tubular portion is horizontal. The three portions of the syphon tube provide a substantially continuous flow path. The syphon tube may be inserted into the valve nipple of a fully assemble vent valve which facilitates assembly, handling and shipping of the valve and substantially eliminates the scrapping of vent valves as a result of damaged syphon tubes. Preferably, the syphon tube is injection molded from a plastic such as polypropylene.

6 Claims, 5 Drawing Figures

SYPHON TUBE AND VENT VALVE ASSEMBLY

BACKGROUND OF THE DISCLOSURE

The present invention relates to air vent valves for steam radiators, and more particularly, to improved syphon tubes for use with such air vent valves.

Steam heating systems which include radiators commonly include air vent valves connected to the radiators by means of a threaded valve nipple. When the heating system is energized, excess air in the system is vented through the nipple of the air vent valve, past a liquid-filler float, and out through an opening near the top of the valve. When steam from the radiator enters the valve, the liquid in the float expands, causing the float to seal the vent opening, then when the heating system is de-energized, the radiator and vent valve gradually cool, causing the steam in the vent valve to condense.

It has been well known in the art to provide a syphon tube having one end inserted into the valve nipple and the other end disposed within the radiator, so that when the level of condensate in the vent valve rises to the level of the valve nipple, the syphon tube will drain the condensate back into the radiator.

The syphon tube which has been in common use is a formed copper tube and the end disposed within the valve nipple is flared or enlarged in some other manner to prevent the tube from being withdrawn from the valve nipple. Therefore, the upstream portion of the tube is normally horizontal, the tube includes about a 90° bend and the downstream portion of the tube is oriented downwardly to direct the flow of condensate downward into the radiator. The formed copper syphon tube presently known in the art has the distinct disadvantage of having to be inserted through the valve nipple from the inside of the vent valve before final assembly of the valve. Thus, during subsequent assembly, testing and handling of the assembled vent valve, the syphon tube is already in place and frequently becomes damaged, such as by being bent to the extent that the interior passage defined by the copper tube is pinched off, preventing fluid flow therethrough. If sufficient damage occurs to the syphon tube, the entire vent valve assembly must be scrapped.

Accordingly, it is an object of the present invention to provide a vent valve assembly in which the syphon tube may be inserted after final assembly of the vent valve, to facilitate subsequent testing, handling and shipping of the vent valve and syphon tube assembly.

It is a related object of the present invention to provide a vent valve assembly in which the syphon tube may be snapped in place within the valve nipple at any time, such as at installation of the vent valve assembly to the radiator.

Another type of vent valve syphon tube is illustrated in U. S. Pat. No. 3,583,481, assigned to the assignee of the present invention. In the illustrated vent valve assembly, the syphon tube comprises a flexible tube (rubber or plastic) having a flared insert within the upstream portion of the tube to hold it in place within the valve nipple, and a weighted tube insert at the downstream end of the tube to cause it to bend downward within the radiator, directing the flow of condensate downward. Although the syphon tube of the above-identified patent has some degree of flexibility, it suffers from the same disadvantage as the presently used copper syphon tube; i.e., it must be inserted through the valve nipple before final assembly of the vent valve. In addition, the three piece configuration of the flexible syphon tube complicates the manufacturing and assembly of the valve and adds unnecessary manufacturing expense thereto.

Accordingly, it is an object of the present invention to provide a vent valve assembly which achieves the above-stated objects, and in which the syphon tube is of such a configuration that it may be fabricated, such as by injection molding, as a single piece.

SUMMARY OF THE INVENTION

The above and other objects of the present invention, which will become apparent upon a reading of the following detailed description, and accomplished by the provision of a vent valve assembly of the type including a valve body and a threaded valve nipple adapted to engage a wall of a radiator, and defining a passage communicating between the interior of the radiator and the interior of the valve body. The vent valve includes a syphon tube for draining condensate from the interior of the valve body into the radiator. The syphon tube comprises a tubular first portion adapted to be inserted into the passage defined by the valve nipple, the first portion including resilient tabs disposed about the outer surface thereof. The resilient tabs permit insertion of the tubular first portion into the passage and yieldably engage an inner surface of the valve nipple. The syphon tube further comprises generally trough-shaped second and third portions which cooperate with the tubular first portion to provide a substantially continuous flow path. The second portion is disposed adjacent the tubular first portion and the third portion is oriented relative to the second portion to direct the flow of condensate downwardly when the tubular first portion is oriented generally horizontally.

Preferably, the tubular first portion and troughshaped second and third portions are formed integrally, such as by injection molding, from a polymer plastic.

DESCRIPTION OF THE PREFERRED EMBODIMENT

Figure 1:
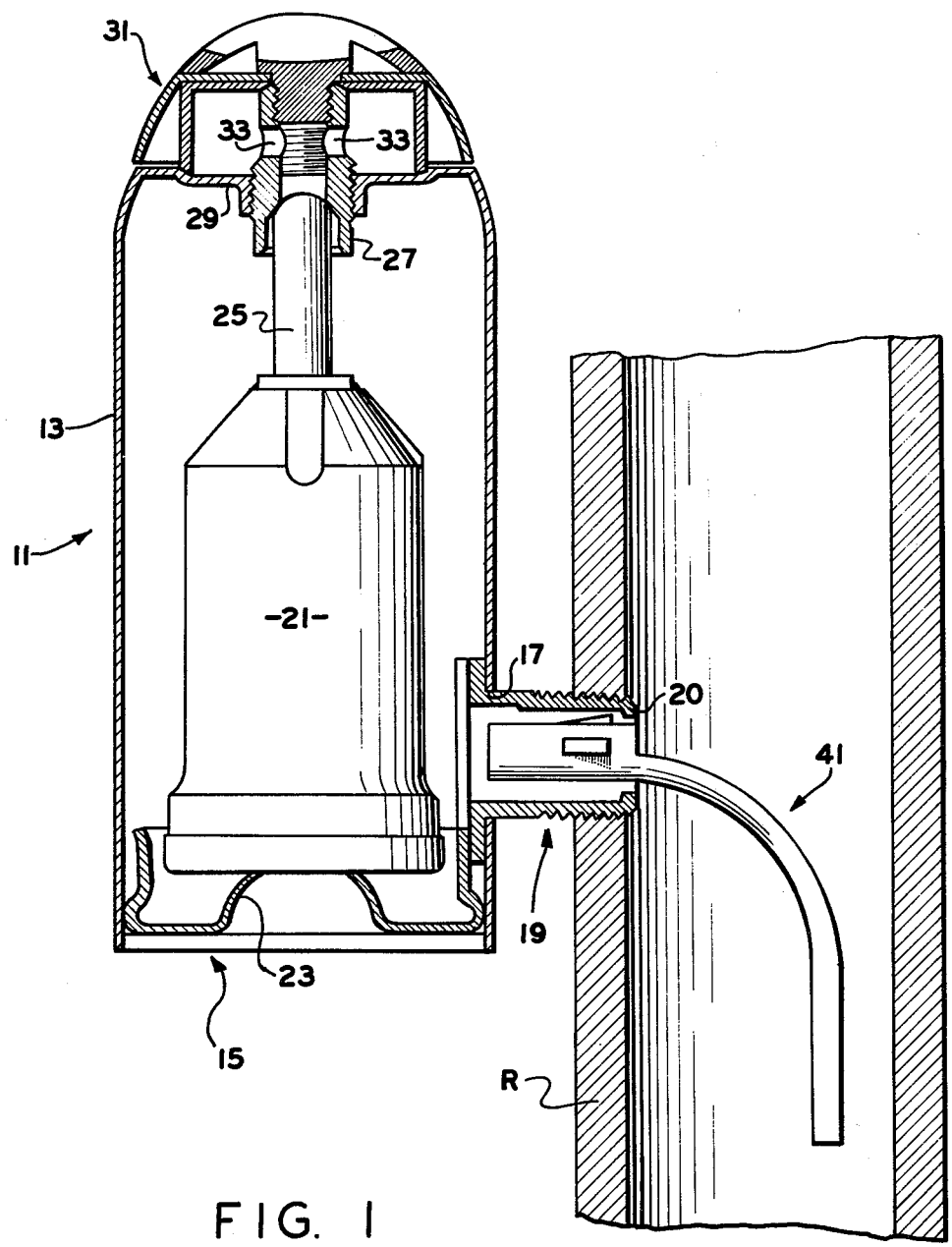
FIG. 1 is a vertical cross section of a radiator vent valve installed on a radiator and utilizing the syphon tube of the present invention.

Referring now to the drawings, which are for the purpose of illustrating a preferred embodiment of the invention, and not for limiting the same, FIG. 1 is a vertical cross section illustrating a vent valve assembly installed on a radiator R. The vent valve assembly includes a vent valve, generally designated 11, which comprises an outer shell 13 and a recessed base member 15. The outer shell 13 defines an inlet opening 17, through which a threaded valve nipple 19 extends and is in threaded engagement with a wall of the radiator. The valve nipple 19 includes an inwardly turned flange or shoulder 20 and defines a passageway in open, fluid communication between the interior of the vent valve 11 and the interior of the radiator R. Disposed within the vent valve 11 is a liquid-filled float assembly 21, which normally rests on a recessed portion 23 of the base member 15.

The float assembly 21 includes a float stem 25 which projects upwardly therefrom and engages an opening within an adjusting screw 27, the adjusting screw 27 being in threaded engagement with a downturned, threaded portion 29 of the outer shell 13. Also in threaded engagement with the adjusting screw 27 is a dial assembly 31, which is used to vary the vent passage, or to shut off the flow of excess air through a pair of air vent passages 33.

Disposed within the passageway defined by the valve nipple 19 and communicating between the vent valve 11 and the radiator R is a syphon tube generally designated 41, which may be seen in greater detail by reference to FIGS. 2-5.

The syphon tube 41 comprises a tubular portion 43 which is inserted inside the valve nipple 19. As shown in FIG. 1, the outside dimension of he tubular portion 43 is preferably somewhat less than the inside dimension of the valve nipple 19, so that steam may pass from the radiator R through the valve nipple 19 into the interior of the vent valve 11 at the same time that condensate is flowing from the vent valve 11 through the tubular portion 43.

Protruding from the outer surface of the tubular portion 43 are three wedge-shaped resilient tabs 45 which, preferably, are of such a size that they are slightly deformed (i.e., compressed) when the tubular portion 43 is inserted into the valve nipple 19 through the opening defined by the shoulder 20. Each of the resilient tabs 45 includes an end surface 47, which after insertion of the tubular portion 43 into the valve nipple 19, engages the inner surface of the shoulder 20. The engagement of the end surfaces 47 with the shoulder 20 prevents the syphon tube 41 from falling out of the valve nipple 19, but the engagement is "yieldable" in that a relatively small pulling force exerted on the syphon tube 41 will cause the resilient tabs 45 to again be slightly deformed, permitting them to pass through the opening defined by the shoulder 20. Although the resilient tabs 45 have been characterized as "yieldably engaging" the inner surface of the valve nipple 19 and shoulder 20, it should be clearly understood that because the tubular portion 43 is loosely disposed within the valve nipple 19, the tabs 45 are not necessarily in contact with the inner surface of the nipple 19 and shoulder 20 at all times.

The syphon tube 41 further includes a trough-shaped portion 51, which cooperates with the tubular portion 43 to provide a smooth, substantially continuous flow path. Therefore, as used herein, the term "trough-shaped" does not indicate any particular configuration, but rather, that the portion 51 is able to transport a flow of fluid while at the same time being sufficiently open to permit manufacture as an integral piece (i.e., such as by injection molding).

Figure 3:
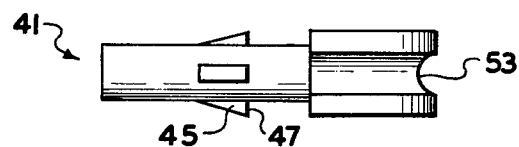
FIG. 3 is a plan view of the syphon tube of the present invention.
Figure 4:
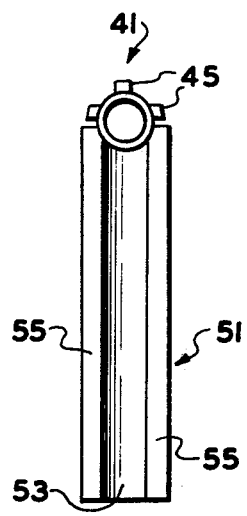
FIG. 4 is an elevation view of the syphon tube of the present invention, taken generally on line 4—4 of FIG. 2.
Figure 5:
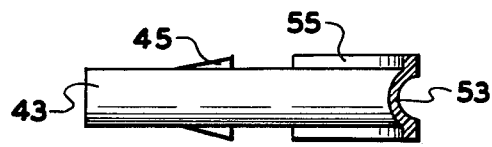
FIG. 5 is a bottom view, illustrating the cross section configuration of the trough-shaped portions of the syphon tube of the present invention, taken along line 5—5 of FIG. 2.

As may best be seen in FIGS. 3 and 5, the trough-shaped portion 51 includes a semi-circular central portion 53, and disposed on either side thereof is a reinforcing rib 55.

Figure 2:
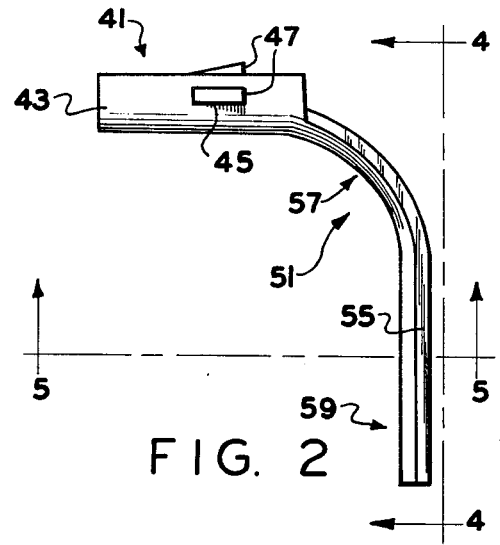
FIG. 2 is a side elevation, similar to FIG. 1, of the syphon tube of the present invention.

Because the tubular portion 43 is normally inserted into the valve nipple 19 in a horizontal orientation, and because it is a function of the syphon tube 41 to direct the flow of condensate downwardly within the radiator R, it is necessary for part of the trough-shaped portion 51 to make a transition from horizontal flow to vertical flow. Therefore, as is best seen in FIG. 2, the trough-shaped portion 51 includes, adjacent the tubular portion 43, an arcuate section 57 and a straight, vertical section 59.

The design of the syphon tube 41 of the present invention permits manufacture thereof as an integral article which, as stated above, is preferably made by a process such as injection molding. Because the syphon tube 41 may be injection molded, it is preferably made from a material which may be easily and economically molded such as an olefin polymer, a common example of which is polypropylene. Thus, it will be appreciated that the present invention provides a syphon tube which is easily and economically manufactured, and which facilitates assembly, handling and shipping, while minimizing the possibility of syphon tube damage and the resulting waste of vent valve assemblies.

The invention has been described in detail sufficient to enable one of ordinary skill in the art to make and use the same. Modifications and alterations of the preferred embodiment will occur to others upon a reading of the specification and it is our intention to include all such modifications and alterations insofar as they come within the scope of the appended claims.

We claim:

1. A radiator vent valve including a valve body and a threaded valve nipple adapted to engage a wall of a radiator and define a passage communicating between the interior of the radiator and the interior of said valve body, said vent valve including a syphon tube for draining condensate from the interior of said valve body into the interior of said radiator, said syphon tube comprising:
   a. a tubular first portion adapted to be inserted into said passage defined by said valve nipple, said tubular first portion including resilient tab means formed of resiliently deformable material disposed in circumferentially spaced arrangement about the outer surface of said tubular first portion, said resilient tab means deforming to permit insertion of said tubular first portion into said passage and after said insertion, resiliently recovering from said deformation and engaging an inner surface of said valve nipple for resisting removal therefrom;
   b. a generally trough-shaped second portion providing a continuous flow path with said tubular first portion and oriented generally coplanar therewith; and
   c. a generally trough-shaped third portion providing a continuous flow path with said trough-shaped second portion, said third portion being oriented relative to said second portion to direct the flow of condensate downwardly when said tubular first portion is oriented generally horizontally.

2. A radiator vent valve as defined in claim 1 wherein said tubular first portion and said trough-shaped second and third portions are formed integrally.

3. A radiator vent valve as defined in claim 1 wherein said syphon tube comprises an injection molded olefin polymer.

4. A radiator vent valve as defined in claim 1 wherein said trough-shaped second and third portions have a generally semi-circular cross-section and include a pair of oppositely disposed reinforcing ribs.

5. A radiator vent valve as defined in claim 1 wherein said trough-shaped second portion includes a generally arcuate section.

6. A syphon tube for use with a radiator vent valve and adapted to be inserted into a valve nipple communicating between the interior of the radiator and the interior of the vent valve, said syphon tube draining condensate from the interior of the vent valve and comprising:
 a. an integral member formed from a resilient moldable plastic material, said integral member having
  i. a generally tubular first portion adapted to be inserted into the valve nipple and including a plurality of tabs formed of resiliently deformable material disposed to project outwardly from the outer surface of said tubular first portion in circumferentially spaced arrangement, said tabs permitting insertion of said first portion into the valve nipple by resilient deformation thereof, and after said insertion, resiliently recovering to engage an inner surface of the valve nipple;
  ii. a generally trough-shaped second portion adjacent said tubular first portion and being substantially coplanar therewith; and
  iii. a generally trough-shaped third portion adjacent said second portion and being oriented relative to said second portion to direct the flow of condensate downwardly when said tubular first portion is oriented generally horizontally;
 b. said tubular first portion and said trough-shaped second and third portions cooperating to define a substantially continuous flow path.

* * * * *

UNITED STATES PATENT AND TRADEMARK OFFICE
CERTIFICATE OF CORRECTION

PATENT NO. : 4,056,118
DATED : 11/1/77
INVENTOR(S) : Jay H. Bradford; Norman T. Terp It is certified that error appears in the above-identified patent and that said Letters Patent are hereby corrected as shown below:

Col. 1, line 13: "liquid-filler" should read---"liquid-filled".

Col. 2, line 37: "troughshaped" should read--trough-shaped.

Signed and Sealed this

Twenty-first Day of February 1978

[SEAL]

Attest:

RUTH C. MASON
Attesting Officer

LUTRELLE F. PARKER
Acting Commissioner of Patents and Trademarks